US011834001B1

(12) United States Patent
Topp

(10) Patent No.: US 11,834,001 B1
(45) Date of Patent: Dec. 5, 2023

(54) VEHICLE IGNITION LOCKOUT ASSEMBLY

(71) Applicant: Keith Topp, Mesa, AZ (US)

(72) Inventor: Keith Topp, Mesa, AZ (US)

( * ) Notice: Subject to any disclaimer, the term of this patent is extended or adjusted under 35 U.S.C. 154(b) by 0 days.

(21) Appl. No.: 17/853,509

(22) Filed: Jun. 29, 2022

(51) Int. Cl.
*B60R 25/24* (2013.01)
*B60R 25/045* (2013.01)

(52) U.S. Cl.
CPC ............ *B60R 25/24* (2013.01); *B60R 25/045* (2013.01)

(58) Field of Classification Search
CPC ............................. B60R 25/24; B60R 25/045
See application file for complete search history.

(56) References Cited

U.S. PATENT DOCUMENTS

| | | | |
|---|---|---|---|
| 5,937,065 A | 8/1999 | Simon | |
| 8,549,318 B2 | 10/2013 | White | |
| D750,521 S | 3/2016 | Poesel | |
| 9,290,095 B2 | 3/2016 | Roth | |
| 9,744,943 B1 | 8/2017 | Hiatt | |
| 2012/0112879 A1* | 5/2012 | Ekchian | ............. A61B 5/14546 340/5.53 |
| 2012/0268259 A1 | 10/2012 | Igel | |
| 2013/0150004 A1* | 6/2013 | Rosen | ............... H04M 3/42357 455/418 |
| 2015/0021113 A1 | 1/2015 | Lefevbre | |
| 2015/0302718 A1* | 10/2015 | Konigsberg | ............. A61B 5/18 340/576 |
| 2016/0280230 A1* | 9/2016 | Hsieh | ........................ B60Q 9/00 |
| 2018/0201131 A1* | 7/2018 | Shen | .................... B60K 28/066 |
| 2023/0028690 A1* | 1/2023 | Woods | ............... A61B 5/14517 |

FOREIGN PATENT DOCUMENTS

EP 870889 9/2005

* cited by examiner

*Primary Examiner* — Thomas D Alunkal

(57) ABSTRACT

A vehicle ignition lockout assembly for prevented a monitored user from driving a vehicle includes a monitoring device and an ignition controller. The monitoring device comprises a transmitter and can be selectively locked, by a monitoring party, around an ankle or a wrist of a monitored user so that the monitored user is prevented from detaching the monitoring device from their person. The ignition controller comprises a receiver and is mountable to an element of a vehicle proximate to an ignition relay of the vehicle. The ignition controller also is operationally engageable to the ignition relay. When the monitored user is positioned in a driver's seat of the vehicle, the receiver and the transmitter are in wireless communication and the ignition controller deactuates the ignition relay. The vehicle is operable when the monitored user is seated elsewhere in the vehicle.

9 Claims, 5 Drawing Sheets

VEHICLE IGNITION LOCKOUT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to lockout assemblies and more particularly pertains to a new lockout assembly for prevented a monitored user from driving a vehicle. The present invention discloses lockout assembly that prevents a monitored user from starting a vehicle.

(2) Description of Related Art Including Information Disclosed Under 37 CFR 1.97 and 1.98

The prior art relates to lockout assemblies, which may comprise biometric authenticators and substance detectors in combination with ignition controllers. Related prior art comprises keyless vehicle control systems. The prior art and the related prior art depend on receipt of a wireless signal to enable a vehicle to be started. What is lacking in the prior art is a lockout assembly comprising a monitoring device, which is lockable to a monitored user, and an ignition controller that is operationally engaged to ignition relay of the vehicle. When a receiver of the ignition controller receives a signal from a transmitter of the monitoring device, the ignition controller is deactuates the ignition relay and prevents the vehicle from being started.

BRIEF SUMMARY OF THE INVENTION

An embodiment of the disclosure meets the needs presented above by generally comprising a monitoring device and an ignition controller. The monitoring device comprises a transmitter and is configured to be selectively locked, by a monitoring party, around an ankle or a wrist of a monitored user so that the monitored user is prevented from detaching the monitoring device from their person. The ignition controller comprises a receiver and is configured to be mounted to an element of a vehicle proximate to an ignition relay of the vehicle. The ignition controller also is configured to be operationally engaged to the ignition relay. The receiver and the transmitter are configured for short range wireless communication. When the monitored user is positioned in a driver's seat of the vehicle, the receiver receives a signal from the transmitter and the ignition controller is configured to deactuate the ignition relay. The vehicle is operable when the monitored user is seated elsewhere in the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
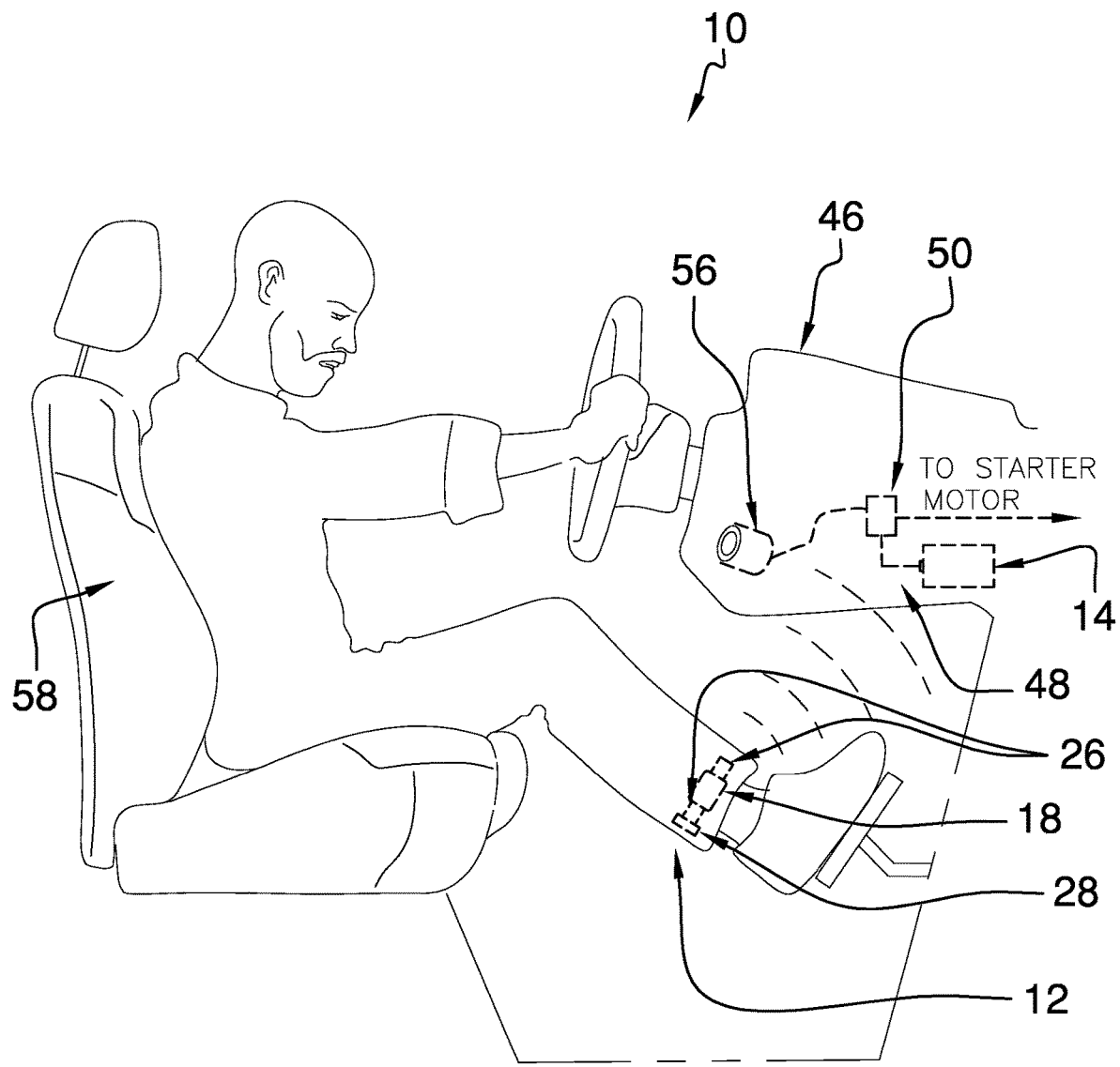
FIG. 1 is an in-use view of a vehicle ignition lockout assembly according to an embodiment of the disclosure.

With reference now to the drawings, and in particular to FIGS. 1 through 5 thereof, a new lockout assembly embodying the principles and concepts of an embodiment of the disclosure and generally designated by the reference numeral 10 will be described.

Figure 4:
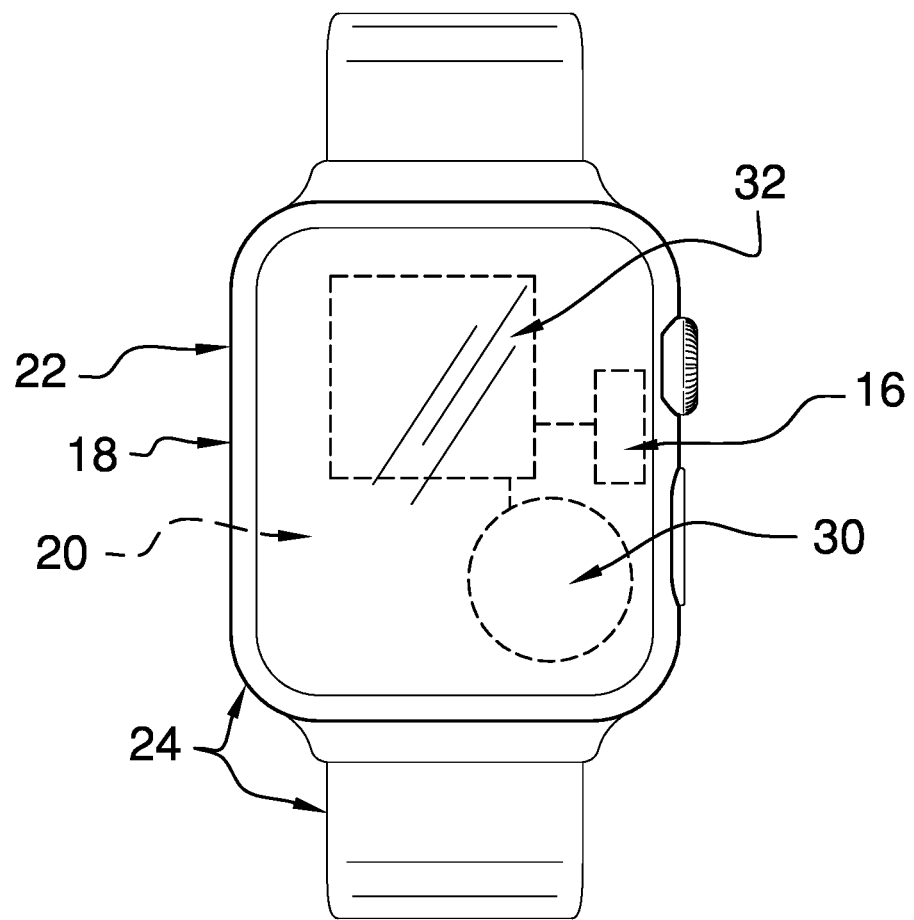
FIG. 4 is a detail view of an embodiment of the disclosure.
Figure 5:
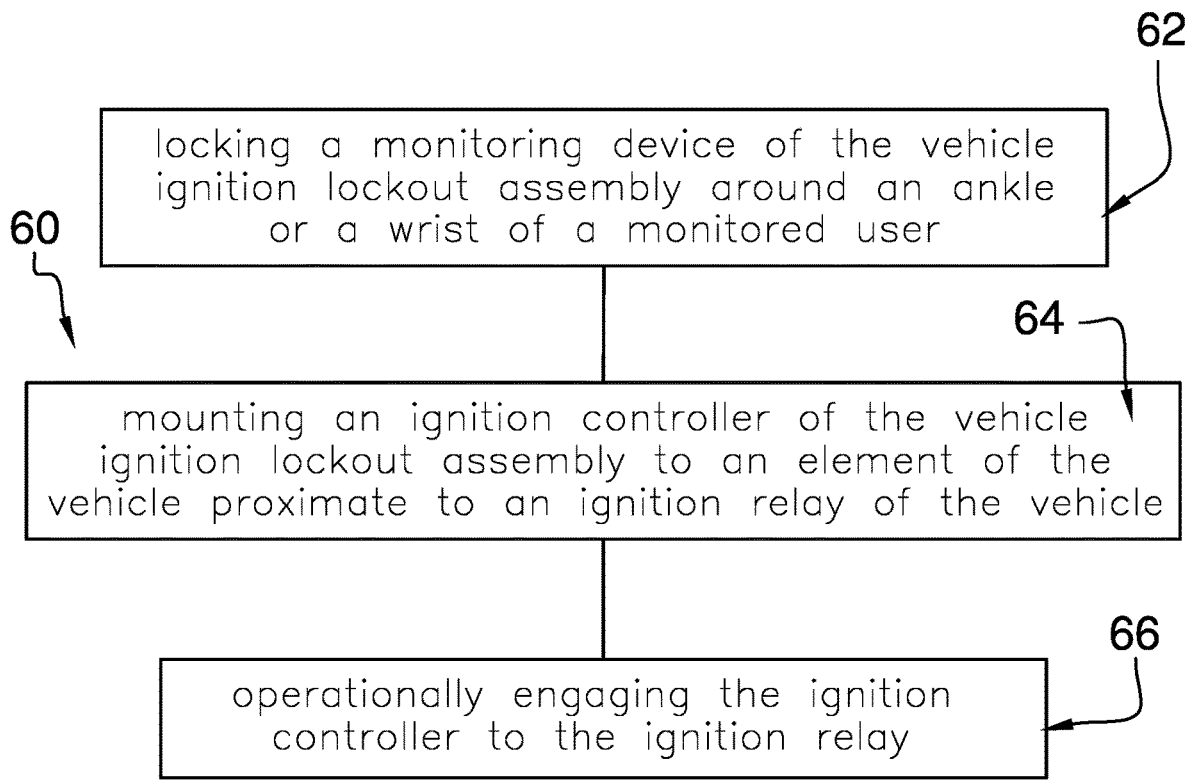
FIG. 5 is a flow diagram for a method utilizing an embodiment of the disclosure.

As best illustrated in FIGS. 1 through 5, the vehicle ignition lockout assembly 10 generally comprises vehicle ignition lockout assembly 10 a monitoring device 12 and an ignition controller 14. The monitoring device 12 comprises a transmitter 16 and is configured to be selectively locked, by a monitoring party, around an ankle of a user, as shown in FIG. 1, or a wrist of a monitored user (not shown). The monitored user is prevented from detaching the monitoring device 12 from their person. The monitoring device 12 comprises a remote housing 18, which defines an interior space 20. The remote housing 18 may be configured as the body 22 of a watch 24, as shown in FIG. 4.

A strap 26 is attached to and the remote housing 18 and is configured to be positioned around the ankle or the wrist of the monitored user. A locking unit 28 is attached to one or both of the strap 26 and the remote housing 18 and is configured to be selective locked by the monitoring party so that the strap 26 is secured around the ankle or the wrist of the monitored user and the monitored user is prevented from detaching the remote housing 18 from their person. Such locking means are well known to those skilled in the art of electronic monitoring device 12s.

A battery 30, a remote microprocessor 32, and the transmitter 16 are engaged to the remote housing 18 and are positioned in the interior space 20. The remote microprocessor 32 is operationally engaged to the battery 30 and the transmitter 16.

The ignition controller 14 comprises a fixed housing 34, which defines an internal space 36. A power module 38, a fixed microprocessor 40, and a receiver 42 are attached to the fixed housing 34 and are positioned in the internal space 36. The fixed microprocessor 40 is operationally engaged to the power module 38 and the receiver 42. The present invention anticipates the ignition controller 14 being one or both of battery powered or operationally engageable to an electrical circuit of a vehicle 46.

Figure 2:
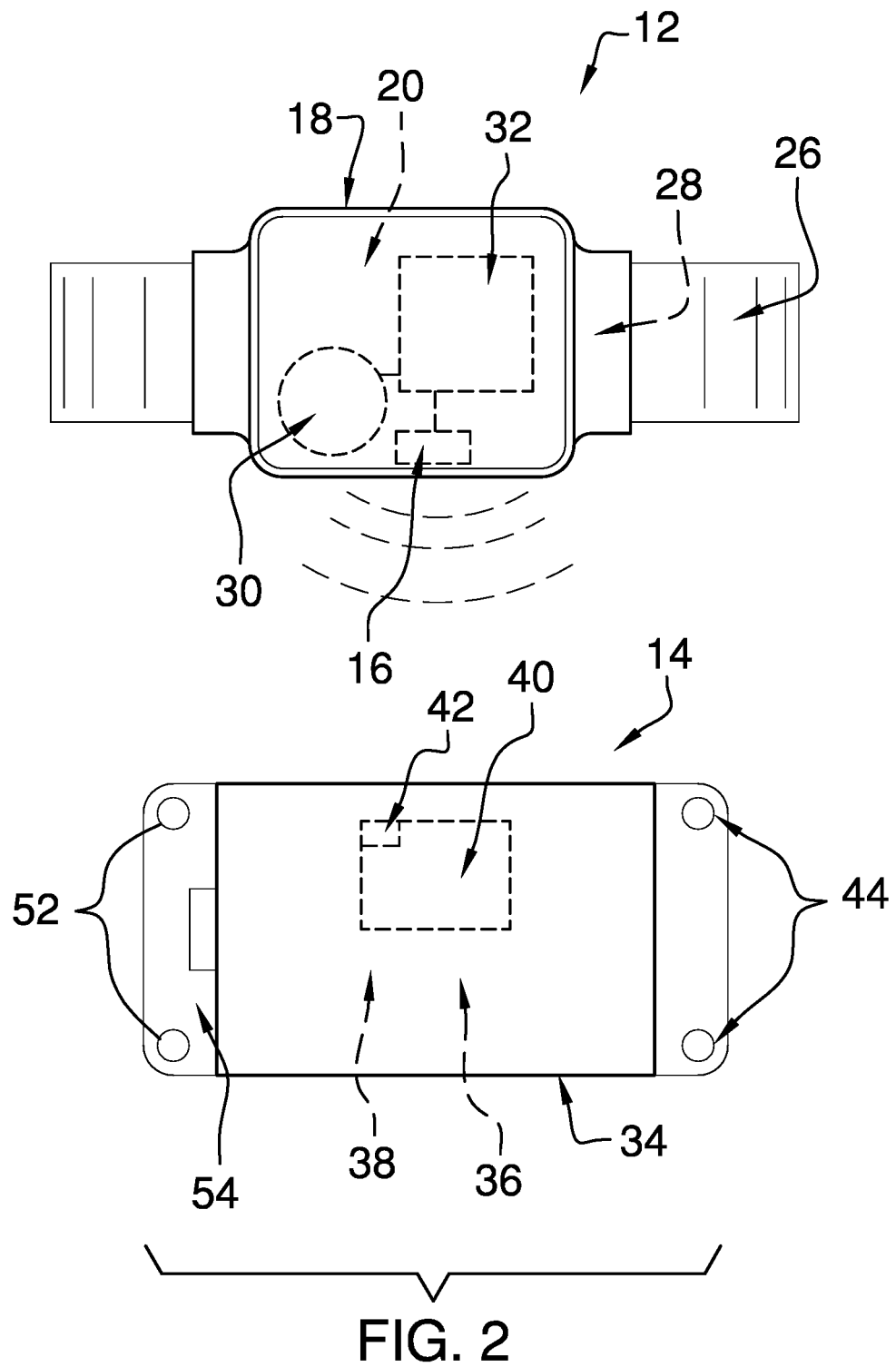
FIG. 2 is a detail view of an embodiment of the disclosure.
Figure 3:
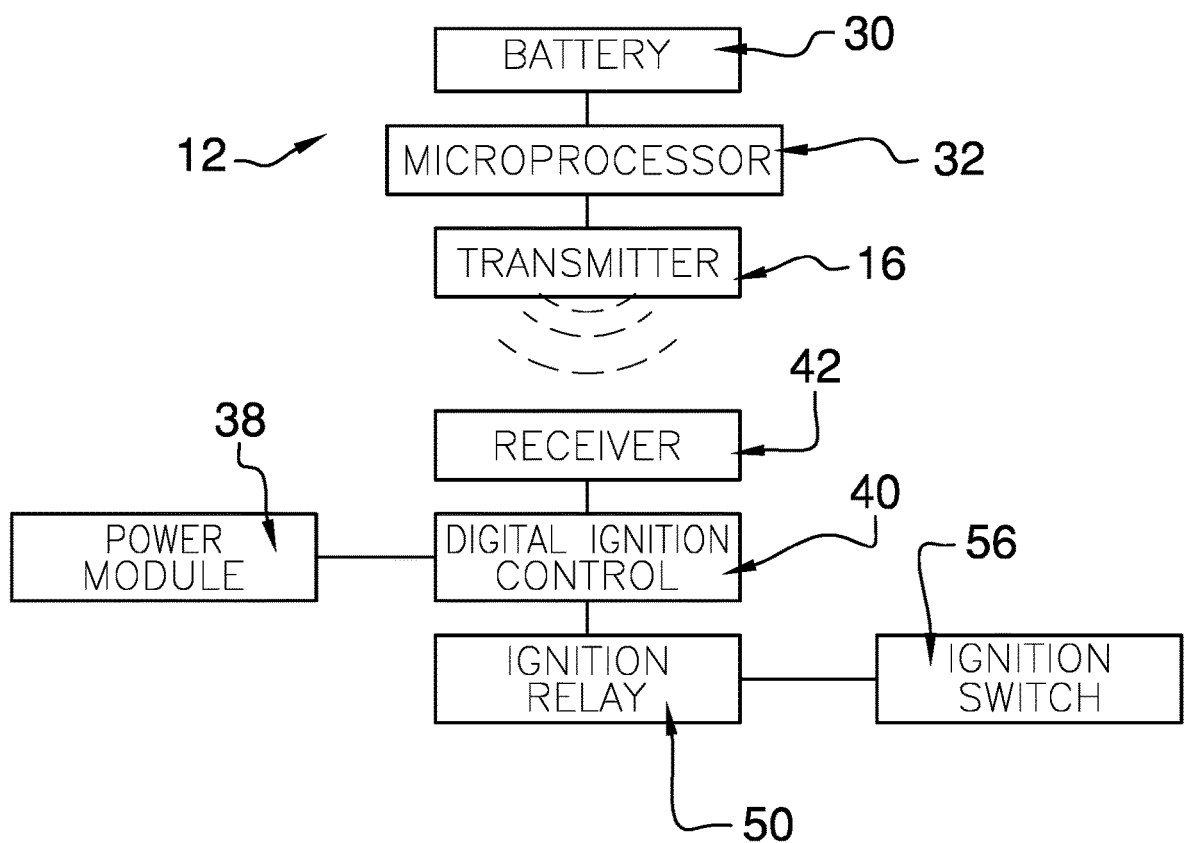
FIG. 3 is a block diagram of an embodiment of the disclosure.

A fastener 44 is attached to the fixed housing 34 and is configured for attachment to an element 48 of the vehicle 46 proximate to an ignition relay 50 of the vehicle 46 so that the fixed housing 34 is mounted to the element 48. As shown in FIG. 2, the fastener 44 may comprise a plurality of holes 52, which is positioned in a flange 54 that attached to and which extends from the fixed housing 34. Each hole 52 is configured for insertion of a respective item of mounting hardware (not shown) to mount the fixed housing 34 to the element 48.

The ignition controller 14 also is configured to be operationally engaged to the ignition relay 50. As shown in FIG. 1, the ignition controller 14 is connected to the ignition relay 50 without being directly connected to either of an ignition switch 56 or starter motor (not shown) of the vehicle 46. The present invention also anticipates the ignition controller 14 being positioned inline between the ignition switch 56 and the ignition relay 50 or inline between the ignition relay 50 and the starter motor.

The receiver 42 and the transmitter 16 are configured for short range wireless communication. When the monitored user is positioned in a driver's seat 58 of the vehicle 46, the receiver 42 receives a signal from the transmitter 16 and the ignition controller 14 is configured to deactuate the ignition relay 50. The vehicle 46 is operable when the monitored user is seated elsewhere in the vehicle 46. Thus, a monitored user who is prohibited from driving would not be able to operate the vehicle 46, but still could be a passenger in the vehicle 46.

In use, the vehicle ignition lockout assembly 10 enables a method of locking out an ignition relay 60. The method 60 comprises a first step 62 of locking a monitoring device 12 of the vehicle ignition lockout assembly 10 around an ankle or a wrist of a monitored user. A second step 64 of the method 60 is mounting an ignition controller 14 of the vehicle ignition lockout assembly 10 to an element 48 of the vehicle 46 proximate to an ignition relay 50 of the vehicle 46. A third step 66 of the method 60 is operationally engaging the ignition controller 14 to the ignition relay 50. When the monitored user is positioned in a driver's seat 58 of the vehicle 46, a receiver 42 of the ignition controller 14 and the transmitter 16 of the monitoring device 12 are in short range wireless communication and the ignition relay 50 is deactuated. When the monitored user is seated elsewhere in the vehicle 46, the vehicle 46 is operable.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle ignition lockout assembly comprising:

a monitoring device comprising a transmitter and being configured for being selectively locked, by a monitoring party, around an ankle or a wrist of a monitored user, such that the monitored user is prevented from detaching the monitoring device from their person;

an ignition controller comprising a receiver and being configured for mounting to an element of a vehicle proximate to an ignition relay of the vehicle, the ignition controller being configured for operationally engaging the ignition relay, the receiver and the transmitter being configured for short range wireless communication, such that the ignition controller is enabled for deactuating the ignition relay when the receiver is receiving a signal from the transmitter, wherein the ignition controller is configured for deactuating the ignition relay when the monitored user is positioned in a driver's seat of the vehicle, but the vehicle is operable with the monitored user being seated elsewhere in the vehicle;

the monitoring device comprises
a remote housing defining an interior space,
a strap attached to and the remote housing, wherein the strap is configured for positioning around the ankle or the wrist of the monitored user,
a locking unit attached to one or both of the strap and the remote housing and being configured for selective locking by the monitoring party, such that the strap is secured around the ankle or the wrist of the monitored user and the monitored user is prevented from detaching the remote housing from their person, and
a battery, a remote microprocessor, and the transmitter being engaged to the remote housing and positioned in the interior space, the remote microprocessor being operationally engaged to the battery and the transmitter; and the ignition controller comprises
a fixed housing defining an internal space,
a power module, a fixed microprocessor, and the receiver being attached to the fixed housing and positioned in the internal space, the fixed microprocessor being operationally engaged to the power module and the receiver, and
a fastener attached to the fixed housing and being configured for attachment to the element of the vehicle, such that the fixed housing is mounted to the element, the fastener comprising a plurality of holes positioned in a flange attached to and extending from the fixed housing, wherein each hole is configured for insertion of a respective item of mounting hardware for mounting the fixed housing to the element.

2. The vehicle ignition lockout assembly of claim 1, wherein the monitoring device comprises:
a remote housing defining an interior space;
a strap attached to and the remote housing, wherein the strap is configured for positioning around the ankle or the wrist of the monitored user;
a locking unit attached to one or both of the strap and the remote housing and being configured for selective locking by the monitoring party, such that the strap is secured around the ankle or the wrist of the monitored user and the monitored user is prevented from detaching the remote housing from their person; and
a battery, a remote microprocessor, and the transmitter being engaged to the remote housing and positioned in the interior space, the remote microprocessor being operationally engaged to the battery and the transmitter.

3. The vehicle ignition lockout assembly of claim 2, wherein the remote housing is configured as the body of a watch.

4. The vehicle ignition lockout assembly of claim 1, wherein the ignition controller comprises:
a fixed housing defining an internal space;
a power module, a fixed microprocessor, and the receiver being attached to the fixed housing and positioned in the internal space, the fixed microprocessor being operationally engaged to the power module and the receiver; and
a fastener attached to the fixed housing and being configured for attachment to the element of the vehicle, such that the fixed housing is mounted to the element.

5. A vehicle ignition lockout assembly comprising:
a monitoring device comprising a transmitter and being configured for being selectively locked, by a monitoring party, around an ankle or a wrist of a monitored user, such that the monitored user is prevented from detaching the monitoring device from their person;
an ignition controller comprising a receiver and being configured for mounting to an element of a vehicle proximate to an ignition relay of the vehicle, the ignition controller being configured for operationally engaging the ignition relay, the receiver and the transmitter being configured for short range wireless communication, such that the ignition controller is enabled for deactuating the ignition relay when the receiver is receiving a signal from the transmitter, wherein the ignition controller is configured for deactuating the ignition relay when the monitored user is positioned in a driver's seat of the vehicle, but the vehicle is operable with the monitored user being seated elsewhere in the vehicle;
wherein the ignition controller comprises
a fixed housing defining an internal space,
a power module, a fixed microprocessor, and the receiver being attached to the fixed housing and positioned in the internal space, the fixed microprocessor being operationally engaged to the power module and the receiver, and
a fastener attached to the fixed housing and being configured for attachment to the element of the vehicle, such that the fixed housing is mounted to the element; and wherein the fastener comprises a plurality of holes positioned in a flange attached to and extending from the fixed housing, wherein each hole is configured for insertion of a respective item of mounting hardware for mounting the fixed housing to the element.

6. The vehicle ignition lockout assembly of claim 1, wherein the remote housing is configured as the body of a watch.

7. A vehicle ignition lockout system comprising:
a monitoring device comprising a transmitter and selectively locked, by a monitoring party, around an ankle or a wrist of a monitored user, such that the monitored user is prevented from detaching the monitoring device from their person;
a vehicle;
an ignition controller comprising a receiver, the ignition controller being mounted to an element of the vehicle proximate to an ignition relay of the vehicle, the ignition controller being operationally engaged to the ignition relay, the receiver and the transmitter being configured for short range wireless communication, such that the ignition controller is enabled for deactuating the ignition relay when the monitored user is positioned in a driver's seat of the vehicle, but the vehicle is operable with the monitored user being seated elsewhere in the vehicle;
wherein the ignition controller comprises
a fixed housing defining an internal space,
a power module, a fixed microprocessor, and the receiver being attached to the fixed housing and positioned in the internal space, the fixed microprocessor being operationally engaged to the power module and the receiver, and
a fastener attached to the fixed housing and to the element of the vehicle, such that the fixed housing is mounted to the element; and
wherein the fastener comprises a plurality of holes positioned in a flange attached to and extending from the fixed housing, each hole having a respective item of mounting hardware of a plurality of items of mounting hardware inserted, such that the fixed housing is mounted to the element.

8. The vehicle ignition lockout system of claim 7, wherein the monitoring device comprises:
a remote housing defining an interior space;
a strap attached to and the remote housing, wherein the strap is configured for positioning around the ankle or the wrist of the monitored user;
a locking unit attached to one or both of the strap and the remote housing and being locked the monitoring party, such that the strap is secured around the ankle or the wrist of the monitored user and the monitored user is prevented from detaching the remote housing from their person; and
a battery, a remote microprocessor, and the transmitter being engaged to the remote housing and positioned in the interior space, the remote microprocessor being operationally engaged to the battery and the transmitter.

9. The vehicle ignition lockout system of claim 8, wherein the remote housing is configured as the body of a watch.

* * * * *